(12) United States Patent
Sato

(10) Patent No.: US 8,188,401 B2
(45) Date of Patent: May 29, 2012

(54) WIRE ELECTRIC DISCHARGE MACHINING APPARATUS

(75) Inventor: Tatsushi Sato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 951 days.

(21) Appl. No.: 11/569,876

(22) PCT Filed: Aug. 22, 2005

(86) PCT No.: PCT/JP2005/015201
§ 371 (c)(1),
(2), (4) Date: Dec. 1, 2006

(87) PCT Pub. No.: WO2006/027946
PCT Pub. Date: Mar. 16, 2006

(65) Prior Publication Data
US 2009/0014420 A1 Jan. 15, 2009

(30) Foreign Application Priority Data
Sep. 10, 2004 (JP) .................................. 2004-264118

(51) Int. Cl.
*B23K 9/00* (2006.01)
*B23K 9/08* (2006.01)
*B23H 7/00* (2006.01)
*B23H 7/14* (2006.01)
*H01F 27/36* (2006.01)

(52) U.S. Cl. ................ 219/69.11; 219/69.12; 219/69.13; 219/69.15; 219/123; 336/84 R; 336/127; 336/131

(58) Field of Classification Search ................ 219/69.11, 219/69.12, 69.13, 69.15, 69.17, 123; 336/84 R, 336/127, 131
See application file for complete search history.

(56) References Cited

U.S. PATENT DOCUMENTS

| 5,025,489 A * | 6/1991 | Yamaguchi .................... 219/760 |
| 5,430,278 A * | 7/1995 | Krieg et al. .................... 235/449 |
| 6,049,650 A * | 4/2000 | Jerman et al. ................. 385/137 |
| 6,069,335 A | 5/2000 | Kinbara |
| 6,917,273 B2 * | 7/2005 | Okamoto ....................... 336/200 |
| 6,940,366 B2 * | 9/2005 | Komiya ......................... 333/181 |
| 7,034,263 B2 * | 4/2006 | Kagan ........................... 219/661 |

FOREIGN PATENT DOCUMENTS

| JP | 10-55508 | 2/1998 |
| JP | 10-249645 | 9/1998 |
| JP | 2000-94221 | 4/2000 |
| JP | 2000-109397 | 4/2000 |
| JP | 2000094221 A * | 4/2000 |
| KR | 2003-0023832 * | 3/2003 |

* cited by examiner

*Primary Examiner* — Henry Yuen
*Assistant Examiner* — Ayub Maye
(74) *Attorney, Agent, or Firm* — Leydig, Voit & Mayer, Ltd.

(57) ABSTRACT

A wire electric discharge machining apparatus includes guide rollers and a single electrode wire that is wrapped around each of the guide rollers to form cut wire portions that are spaced from one another between pairs of the guide rollers. A processing power supply feeds electric power to the individual cut wire portions through a power feed element. A high frequency insulator includes wound coils of the electrode wire that are located between adjacent cut wire portions, and cores which close respective magnetic circuits of the individual coils. The magnetic circuits are magnetically insulated from one another. The power feed element is arranged between the individual cut wire portions and the individual coils, and the individual cut wire portions are insulated from one another at high frequencies by the individual coils. Voltages are impressed on the individual cut wire portions independently, so discharges can be generated simultaneously, in parallel.

7 Claims, 4 Drawing Sheets

WIRE ELECTRIC DISCHARGE MACHINING APPARATUS

TECHNICAL FIELD

The present invention relates to a wire electric discharge machining apparatus that removes a part of a work piece by generating discharges between an electrode wire and the work piece.

BACKGROUND ART

There has been proposed a scheme in which when a thin plate is sliced from a column-shaped member by means of wire electric discharge machining, an electrode wire is wrapped around a plurality of guide rollers which are spaced apart from one another to form a multitude of spaced-apart cut wire portions, and electric power is separately supplied to the individual cut portions to cause discharges at the same time for improved productivity (for example, a first patent document).

In this case, though all the cut wire portions become conductive with respect to one another, a coil is formed between any adjacent two of the cut wire portions by winding the electrode wire around a specific guide roller in a plurality of turns, whereby the insulation performance between the individual cut wire portions is improved by the impedance of each coil arranged therebetween, thereby suppressing a voltage impressed on a specific cut wire portion from being distributed to adjacent cut wire portions.

FIRST PATENT DOCUMENT

Japanese patent application laid-open No. 2000-94221

DISCLOSURE OF THE INVENTION

Problems to be Solved by the Invention

In such a wire electric discharge machining apparatus, however, each coil is formed by winding the electrode wire around the specific guide roller in the plurality of turns, so many of magnetic fields generated by an electric current flowing through one coil pass the interiors of other coils. In other words, in such a construction, a mutual inductance formed by arbitrary two coils is very large, so all the coils become electromagnetically closely coupled with one another. In addition, high permeable magnetic materials such as iron, etc., are often used for the guide rollers, and the electrode wire as long as possible is used so that the resistance of the electrode wire is utilized so as to increase a direct current impedance. As a result, the number of turns of the electrode wire tends to be increased, so the electromagnetic coupling of the individual coils is strong.

Accordingly, when a discharge is generated in one cut wire portion to cause a voltage variation, its influence is greatly exerted on all the cut wire portions. Thus, there arises a problem that it is in actuality very difficult to feed electric power to the individual cut wires separately or independently.

The present invention is intended to obviate the problems as referred to above, and has for its object to obtain a wire electric discharge machining apparatus which is capable of impressing voltages to individual cut wire portions independently thereby to cause discharges in a simultaneous and parallel manner.

Means for Solving the Problems

A wire electric discharge machining apparatus according to the present invention includes: a plurality of guide rollers that are arranged at intervals; one electrode wire that is wrapped around each of the plurality of guide rollers to form a plurality of cut wire portions spaced from one another between a pair of the guide rollers; a processing power supply that feeds electric power to the individual cut wire portions through a power feed element; and a high frequency insulator that has coils which are formed of the electrode wire wound around between adjacent ones of the cut wire portions, respectively, and cores which are made of a magnetic material so as to close magnetic circuits of the individual coils, respectively, and are magnetically insulated from one another. The power feed element is arranged between the individual cut wire portions and the individual coils, and the individual cut wire portions are insulated from one another by the individual coils in a high frequency manner.

Effects of the Invention

According to a wire electric discharge machining apparatus of the present invention, a magnetic field generated by each coil stays within a corresponding individual magnetic member and hence does not induce an electromotive force in other coils. As a result, it becomes possible to impress voltages to the individual cut wire portions in an independent manner, so discharges can be generated in a simultaneous and parallel manner.

BEST MODE FOR CARRYING OUT THE INVENTION

Figure 1:
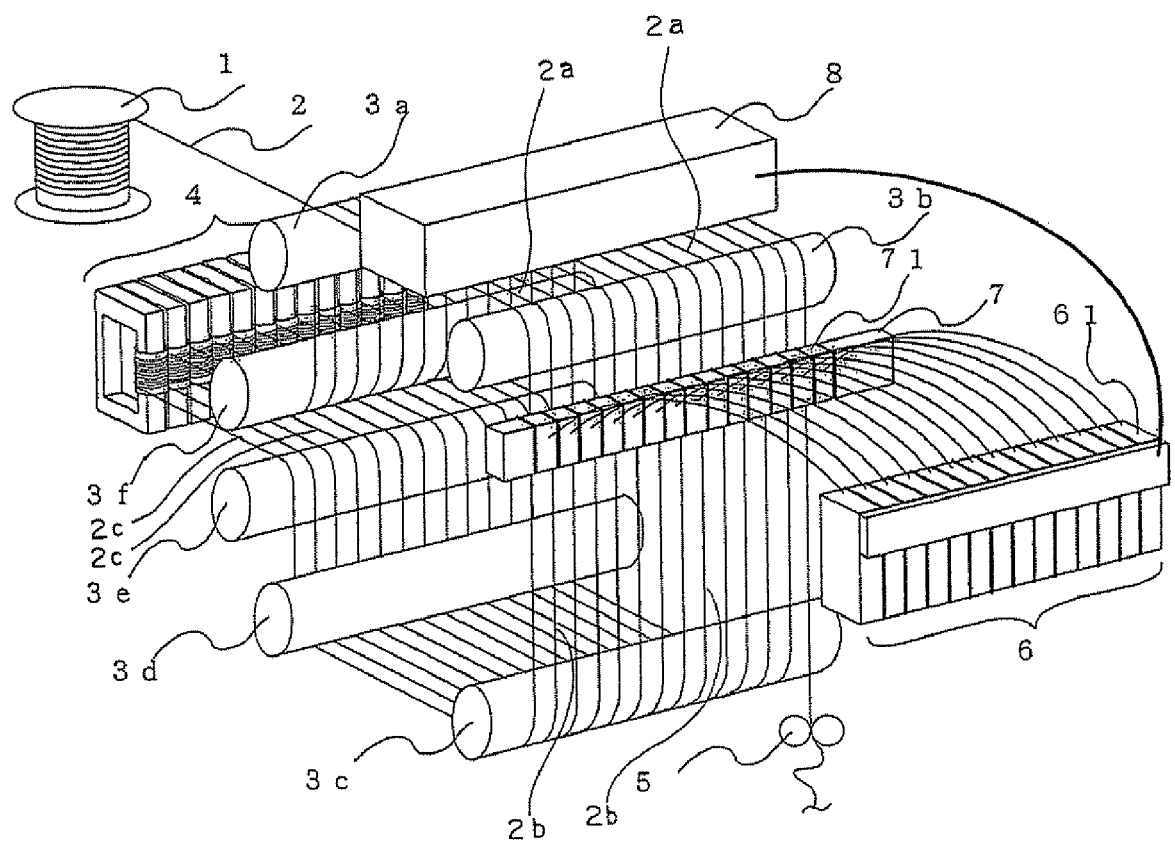
FIG. 1 is a perspective view showing essential portions of a wire electric discharge machining apparatus according to a first embodiment of the present invention.

Now, preferred embodiments of the present invention will be described in detail while referring to the accompanying drawings. Throughout respective figures, the same or corresponding members or parts are identified by the same reference numerals and characters.

Embodiment 1

Figure 2:
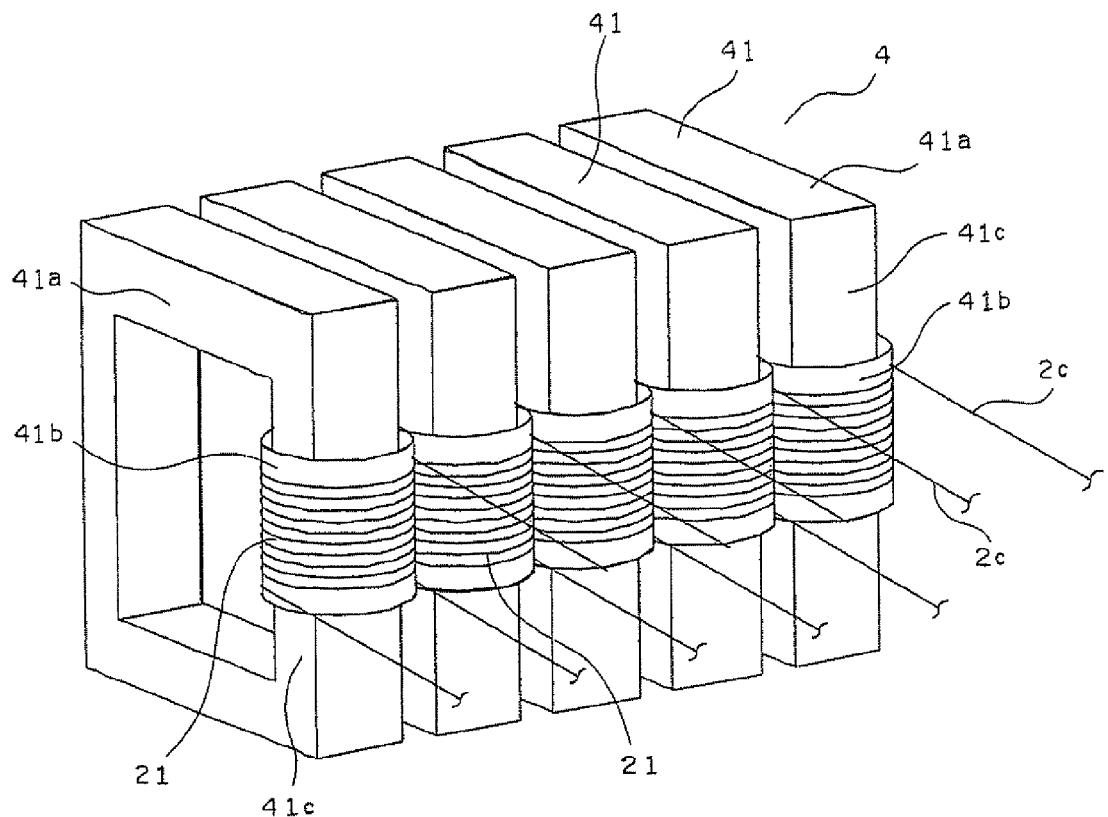
FIG. 2 is a perspective view showing a high frequency insulator of FIG. 1.

FIG. 1 is a perspective view that shows essential portions of a wire electric discharge machining apparatus according to a first embodiment of the present invention. FIG. 2 is a perspective view that shows a high frequency insulator 4 of FIG. 1.

Figure 3:
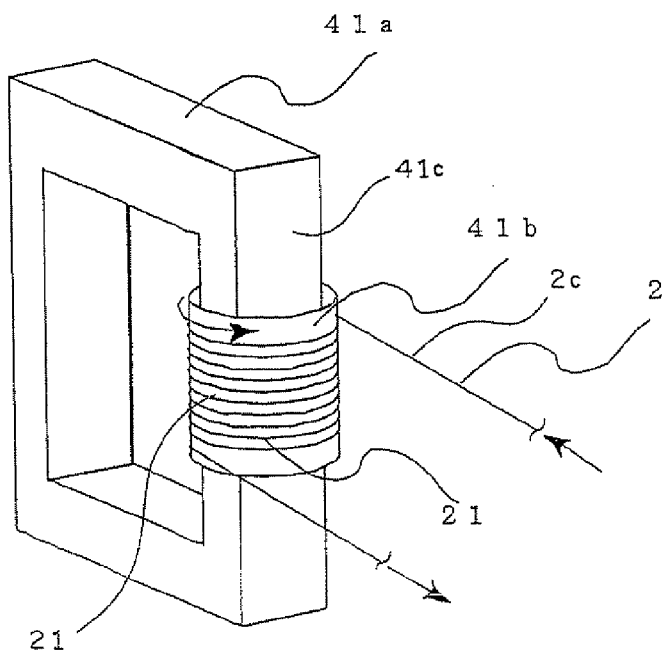
FIG. 3 is a perspective view showing a high frequency insulating element of FIG. 2.

FIG. 3 is a perspective view that shows a high frequency insulating element 41 of FIG. 2.

In this wire electric discharge machining apparatus, there are arranged a first guide roller 3a, a second guide roller 3b, a third guide roller 3c, a fourth guide roller 3d, a fifth guide roller 3e, and a sixth guide roller 3f, around which one electrode wire 2 being drawn out from a wire bobbin 1 is wrapped in a sequential manner, and which are spaced from one another in parallel in an axial direction.

Those portions of the electrode wire 2 which are arranged between the first guide roller 3a and the second guide roller 3b constitute a plurality of cut wire portions 2a that are arranged under tension in parallel with respect to one another. Above the cut wire portions 2a, a work piece 8 of a hexahedral shape made of, for example, a silicon having electric conductivity is held at an appropriate length of a discharge gap by means of a position control system (not shown). Similar to an ordinary wire electric discharge machining apparatus, a working fluid is supplied to between this work piece 8 and the cut wire portions 2a by means of spraying or dipping.

Power feed units 71 are in contact with a plurality of wire portions 2b, respectively, of the electrode wire 2, which are arranged under tension in parallel to one another between the second guide roller 3b and the third guide roller 3c. The individual power feed units 71 are connected to processing power supply units 61, respectively, that impress voltages to the individual cut wire portions 2a through the wire portions 2b. The individual power feed units 71 are closely located to one another while being insulated from one another to constitute a power feed element 7. The individual processing power supply units 61 are constructed such that they can independently impress voltages to the individual cut wire portions 2a through the individual power feed units 71, respectively, and have a common ground, thus constituting a processing power supply 6 as a whole. Since the voltages are of course impressed between the individual cut wire portions 2a and the work piece 8, the common ground of the processing power supply 6 is connected to the work piece 8.

Wire portions 2c of the electrode wire 2 between the fifth guide roller 3e and the sixth guide roller 3f are wound around wheels 41b in a plurality of turns thereby to form coils 21. The wheels 41b are freely rotatable with respect to support rods 41c of ring-shaped cores 41a, respectively, which are made of a magnetic material of high permeability such as soft iron, ferrite, etc., so that they are caused to rotate in accordance with the travel of the electrode wire 2. An arrow in FIG. 3 indicates the direction of travel of the electrode wire 2 and the direction of rotation of each wheel 41b according to the travel of the electrode wire 2. With the use of the wheels 41b, the travel of the electrode wire 2 is made smoother, so a break or disconnection of the electrode wire 2 is prevented.

Here, note that each wheel 41b may have a groove formed on its outer peripheral surface along the path of the electrode wire 2 to be wrapped. With the formation of such grooves, the wire portions 2c forming the coils 21 are prevented from slipping sideways, so it is possible to prevent the function of the coils 21 from being reduced due to the conduction of adjacent wire portions 2c.

Here, the coils 21, the cores 41a and the wheels 41b together constitute high frequency insulating elements 41 which can achieve high frequency insulation between the individual cut wire portions 2b with a simple construction. The high frequency insulating elements 41 are arranged in parallel with respect to one another with air being interposed between adjacent high frequency insulating elements 41, thereby constituting a high frequency insulator 4. Incidentally, in order to magnetically insulate between adjacent high frequency insulating elements 41 with respect to one another, a non-magnetic material such as aluminum may be interposed therebetween.

Here, note that it is of course necessary to independently impress high frequency voltages from the individual processing power supply units 61 to the individual cut wire portions 2a, so the power feed element 7 is arranged between the high frequency insulator 4 and the individual cut wire portions 2a. Moreover, the polarity of voltage impression can of course be properly inverted as required, as in conventional wire electric discharge machining.

Next, the operation of the wire electric discharge machining apparatus as constructed above will be described below.

The one electrode wire 2 drawn out from the wire bobbin 1, after having traveled the first guide roller 3a, the second guide roller 3b, the third guide roller 3c, the fourth guide roller 3d and the fifth guide roller 3e in this order, passes the first guide roller 3a again through the sixth guide roller 3f while rotating the wheels 41b of the high frequency insulating elements 41 arranged at the leftmost in FIG. 1.

Thus, the one electrode wire 2 drawn out from the wire bobbin 1 repeatedly travels through the first guide roller 3a, the second guide roller 3b, the third guide roller 3c, the fourth guide roller 3d, the fifth guide roller 3e, and the sixth guide roller 3f, whereby the plurality of the cut wire portions 2a and the plurality of the coils 21 are formed during the travel of the electrode wire, which is finally discharged from the discharge roller 5.

Under such a condition, the work piece 8 is caused to descend so as to approach the cut wire portions 2a, and at the same time, electric power is fed from the processing power supply 6 to the cut wire portions 2a through the power feed element 7, so that a pulse voltage of 10 kHz or more for instance is impressed between the cut wire portions 2a and the work piece 8, and a lot of fragments are cut from the work piece 8.

As described in the foregoing, according to the wire electric discharge machining apparatus of the above-mentioned construction, the electrode wire 2 forms the coils, so it has a large self inductance. Accordingly, the high frequency voltage impressed by the processing power supply 6 is remarkably attenuated at locations away from the coils 21. That is, the high frequency voltage is attenuated remarkably in the sixth guide roller 3f as compared with the fifth guide roller 3e.

In addition, each core 41a made of a magnetic material is of a ring-shaped configuration in which the core 41a passes through the interior of a corresponding coil 21 with its opposite ends being connected with each other in the outside thereof. Thus, the magnetic circuit of the coil 21 is closed.

Further, each core 41a is separated or insulated from adjacent cores 41a of other adjacent high frequency insulating elements 41 by air in the form of a non-magnetic material, so the magnetic circuits of the individual high frequency insulating elements 41 are separated from one another. Accordingly, the magnetic fluxes generated by currents flowing through the individual coils 21 are all confined in the interiors of the cores 41a of the individual high frequency insulating elements 41, respectively and do not leak to the surroundings. As a result, the mutual inductance between any arbitrary two coils 41a is very small. That is, there will be no interactions such as one in which a magnetic flux generated by a current flowing through each coil 21 influences on the other coils 21 thereby to generate electromotive forces therein.

Thus, a high frequency insulating element 41 having an intermediate coil 21 is arranged each time the electrode wire 2 is wrapped between a plurality of guide rollers 3a through 3f, and by closing the magnetic circuit of each coil 21 with a ring-shaped core 41a, the individual cut wire portions 2a become connected to one another through the coils 21 of which the self inductance is large and the mutual inductance is small. Accordingly, the individual cut wire portions 2a are insulated from one another in a high frequency manner, so high frequency voltages can be independently impressed from mutually different processing power supply units 61, thus making it possible to generate simultaneous and parallel discharges.

Here, note that as the ring-shaped cores 41a in the above-mentioned embodiment, there may be adopted a core comprising a plurality of core portions that can be divided or separated, so as to improve workability in winding the electrode wire 2 around the support rods 41c. In this case, it is needless to say that even if there exist fine gaps between the core portions, there is no problem for use as long as magnetic fluxes do not substantially leak to the outside.

In addition, the wheels 41b in the above-mentioned embodiment do not have a function to confine the magnetic fields generated in the coils 21. Accordingly, by making the wire 2 travel smoothly, though not an indispensable component element in the high frequency insulator 4, there is an advantageous effect that a break or disconnection is prevented.

Still further, although in the above-mentioned embodiment, there has been illustrated an example in which the work piece 8 is arranged above the guide rollers 3a through 3f, the work piece 8 may be disposed below them so that those portions of the wire existing between the third guide roller 3c and the fourth guide roller 3d are made the cut wire portions 2a. In addition, various forms of arrangement relations of the work piece 8 with respect to the electrode wire 2 can be considered such as one in which the work piece 8 is arranged at a side so that the wire portions 2b between the second guide roller 3b and the third guide roller 3c is made the cut wire portions 2a, but it is of course needless to say that any form may be adopted as long as the work piece 8 can be arranged in opposition to the electrode wire 2 of which a lot of wire portions are disposed in parallel to one another.

Embodiment 2

The high frequency insulating elements 41 are not limited to such a configuration as shown in FIG. 3, but may take any shape as long as they are formed of a magnetic material with a configuration that closes the magnetic circuits of the coils 21.

Figure 4:
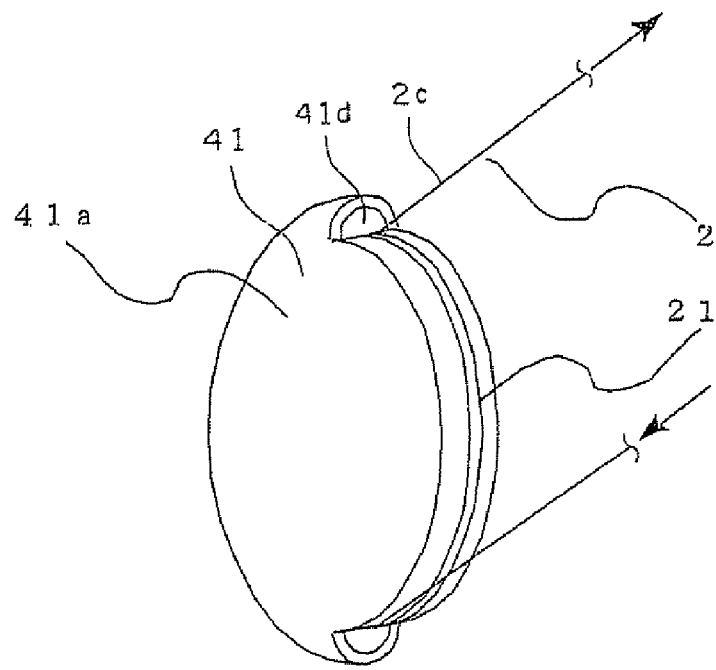
FIG. 4 is a perspective view showing a high frequency insulating element in a wire electric discharge machining apparatus according to a second embodiment of the present invention.

FIG. 4 is a perspective view that shows a high frequency insulating element 41 built in a wire electric discharge machining apparatus according to a second embodiment of the present invention.

In this case, a core 41a is of a disc shape that has a tunnel-shaped hole 41d formed partially of an outer peripheral portion thereof along its edge, and a coil 21 is constructed by winding an electrode wire 2 around the outer peripheral portion while passing through the hole 41d.

Figure 5:
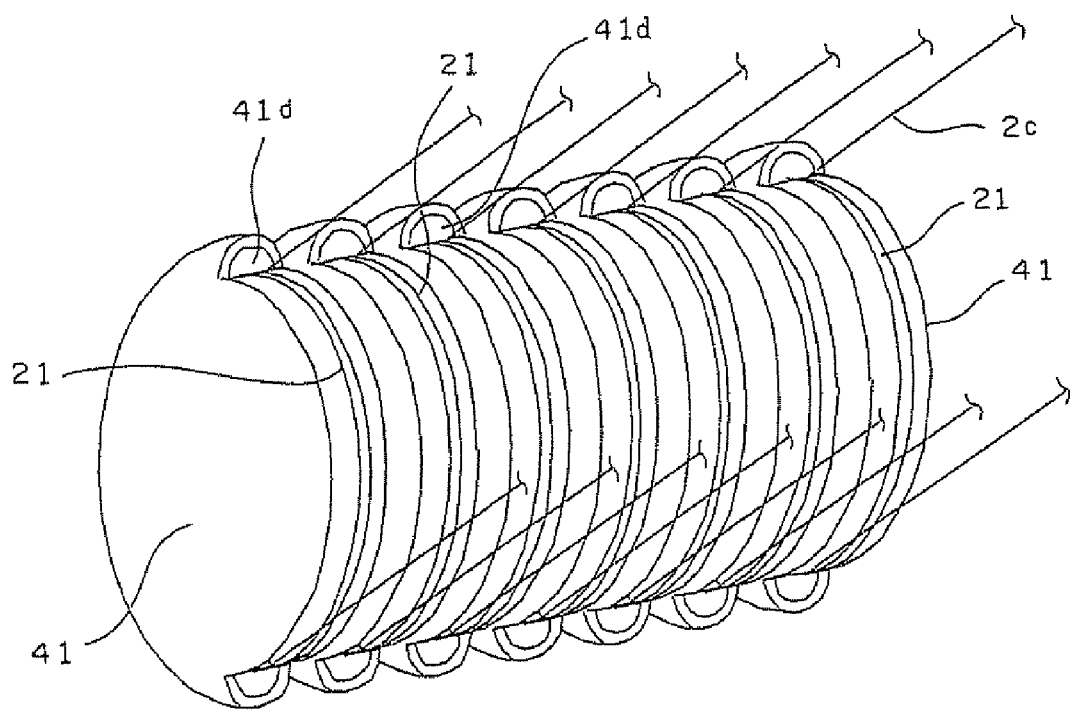
FIG. 5 is a perspective view showing a high frequency insulator in the wire electric discharge machining apparatus according to the second embodiment of the present invention.

According to this high frequency insulating element 41, the coil 21 is arranged on the outer periphery of the core 41a. Accordingly, in case where high frequency insulating elements 41 are arranged in parallel to one another, as shown in FIG. 5, it is possible to reduce the dimensions of a high frequency insulator 4 in a direction of arrangement thereof in comparison with the one of the first embodiment.

Here, note that the construction of this third embodiment other than the above is the same as that of the wire electric discharge machining apparatus according to the first embodiment.

Also, in this case, if free wheels being rotatable with respect to cores 41a are arranged between the cores 41a and coils 21, as in the first embodiment, the travel of the electrode wire 2 becomes smoother, thus making it possible to prevent a break or disconnection thereof.

In addition, if a groove is formed on the outer peripheral surface of each wheel along the path of the electrode wire 2, wire portions 2c forming the coils 21 can be prevented from slipping sideways. As a result, it is possible to prevent reduction in the function of the coils 21 due to the conduction of adjacent wire portions 2c.

Embodiment 3

Figure 6:
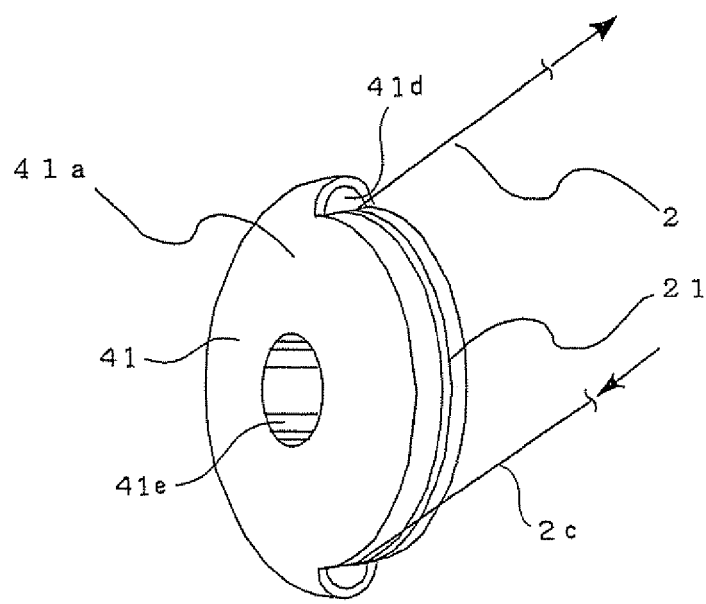
FIG. 6 is a perspective view showing a high frequency insulating element in a wire electric discharge machining apparatus according to a third embodiment of the present invention.

FIG. 6 is a perspective view that shows a high frequency insulating element 41 in a wire electric discharge machining apparatus according to a third embodiment of the present invention.

Figure 7:
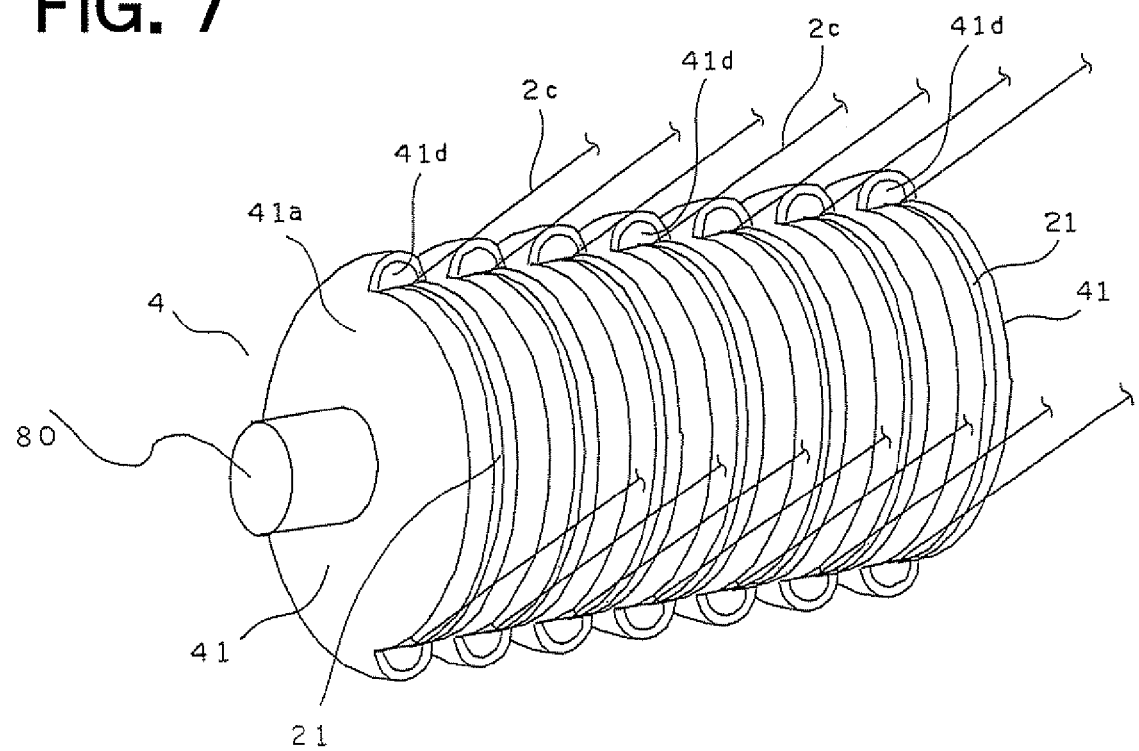
FIG. 7 is a perspective view showing a high frequency insulator in the wire electric discharge machining apparatus according to the third embodiment of the present invention.

In this case, a core 41a has a through hole 41e formed in the center thereof so as to penetrate therethrough in an axial direction. As shown in FIG. 7, a high frequency insulator 4 has a plurality of cores 41a arranged in parallel to one another, and a fixed shaft 80 of a non-magnetic material penetrates through the individual through holes 41e thereby to fixedly secure the individual cores 41a thereto.

According to this high frequency insulator 4, a balancing force to the tension of the electrode wire 2 can be made to act in a direction to compress the cores 41a. Accordingly, there is obtained an advantage that the cores 41a, even if made of a hard brittle material such as ferrite, are not easy to be destroyed.

The invention claimed is:

1. A wire electric discharge machining apparatus comprising:
   a plurality of guide rollers that are arranged at intervals;
   a single electrode wire that is serially wrapped around said plurality of guide rollers to form a plurality of individual cutting wire portions that are spaced from one another between adjacent pairs of said guide rollers;
   a processing power supply including a power feed element that feeds electrical power to said cutting wire portions, individually;
   a plurality of wound coils of said electrode wire, a respective one of said coils being located between each respective adjacent pair of said individual cutting wire portions, respectively; and
   a plurality of cores of magnetic material, each core closing a respective magnetic circuit of each of said individual coils, each respective coil and core being magnetically insulated from the other coils and cores, whereby said individual cutting wire portions are electrically insulated from one another at high frequencies, wherein
      each of said cores has a disc-shaped configuration having an outer peripheral portion along an edge surface of the disc-shaped core and a shroud covering only part of said outer peripheral portion and defining a tunnel along said part of said outer peripheral portion, and
      each of said coils includes a portion of said electrode wire wound around said outer peripheral portion of a respective core having a disc-shaped configuration and passing through the tunnel of said core having the disc-shaped configuration.

2. The wire electric discharge machining apparatus as set forth in claim 1, wherein
   each of said cores has a through hole penetrating the respective core having the disc-shaped configuration, in an axial direction that is substantially perpendicular to the disc-shaped configuration, and a fixed shaft extending through the through holes of said cores and fixed to said cores, fixedly securing said cores to said fixed shaft.

3. The wire discharge machining apparatus as set forth in claim 1, wherein the edge surface of each of said cores having a disc-shaped configuration includes a groove for guiding said electrode wire.

4. The wire discharge machining apparatus as set forth in claim 2, wherein the edge surface of each of said cores having a disc-shaped configuration includes a groove for guiding said electrode wire, and the grooves in said cores having the disc-shaped configuration are transverse to said fixed shaft.

5. A wire electric discharge machining apparatus comprising:

a plurality of guide rollers that are arranged at intervals;

a single electrode wire that is serially wrapped around said plurality of guide rollers to form a plurality of individual cutting wire portions that are spaced from one another between adjacent pairs of said guide rollers;

a processing power supply including a power feed element that feeds electrical power to said cutting wire portions, individually;

a plurality of wound coils of said electrode wire, a respective one of said coils being located between each respective adjacent pair of said individual cutting wire portions, respectively; and a plurality of cores of magnetic material, each core closing a respective magnetic circuit of each of said individual coils, each respective coil and core being magnetically insulated from the other coils and cores, whereby said individual cutting wire portions are electrically insulated from one another at high frequencies, wherein each of said cores has a ring-shaped configuration including, as part of the ring-shaped configuration, a support rod, each of said coils of said electrode wire is wound around said support rod of a respective core, and each of said coils includes a freely rotating wheel that is rotatable with respect to said support rod of said core of the respective coil, each of said coils being wound on one of said wheels.

6. The wire electric discharge machining apparatus as set forth in claim 5, wherein each of said wheels includes a groove in an outer peripheral surface for guiding said electrode wire.

7. The wire discharge machining apparatus as set forth in claim 5, wherein said electrode wire is wound around said wheels transverse to said support rods.

* * * * *